United States Patent [19]
Honjo

[11] Patent Number: 5,337,088
[45] Date of Patent: Aug. 9, 1994

[54] METHOD OF CORRECTING AN IMAGE SIGNAL DECODED IN BLOCK UNITS

[75] Inventor: Masahiro Honjo, Sakai, Japan
[73] Assignee: Matsushita Electric Industrial Co. Ltd., Kadoma, Japan
[21] Appl. No.: 117,553
[22] Filed: Sep. 7, 1993

Related U.S. Application Data
[63] Continuation-in-part of Ser. No. 870,633, Apr. 20, 1992, abandoned.

[30] Foreign Application Priority Data

Apr. 18, 1991 [JP] Japan .................. 3-086955

[51] Int. Cl.$^5$ ............................................. H04N 7/133
[52] U.S. Cl. .................................... 348/420; 348/615
[58] Field of Search ........................... 358/133, 167; H04N 7/133

[56] References Cited

U.S. PATENT DOCUMENTS

| | | | |
|---|---|---|---|
| 4,442,454 | 4/1984 | Powell | 358/167 |
| 5,005,077 | 4/1991 | Samad | 358/140 |
| 5,247,363 | 9/1993 | Sun | 358/167 |

Primary Examiner—Howard W. Britton
Attorney, Agent, or Firm—Wenderoth, Lind & Ponack

[57] ABSTRACT

In signal processing method, bandwidth compression codes an image signal by blocks of plural proximal pixels, and outputs the decoded signal after decoding by the same block units. When a level difference occurs during decoding at the border between adjacent blocks, the level of the pixels near the block border is corrected so that the level difference is reduced before outputting the decoded signal. In addition, if the level difference between two pixels within the same block and at the border thereof is less than a predetermined level during decoding, and the difference between the level of two border pixels in adjacent blocks is greater than the level difference of the two pixels within the same block, the decoded signal is output after pixel level correction is applied near the block border to reduce the level difference of the two pixels in the adjacent blocks. Thus, the level difference between blocks is smoothed, and visual image deterioration resulting from block distortion can be greatly improved.

3 Claims, 2 Drawing Sheets

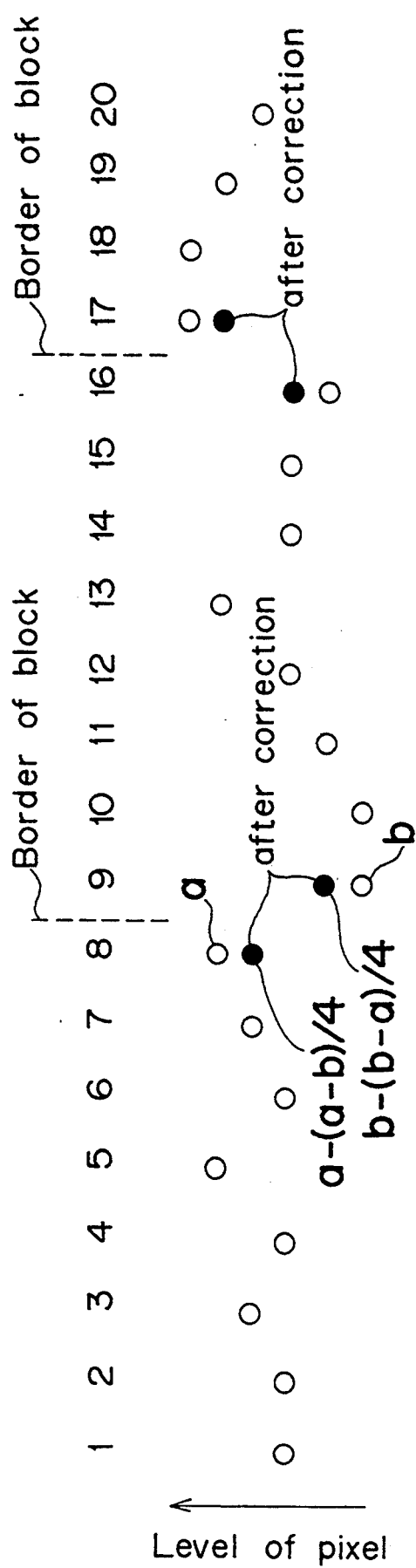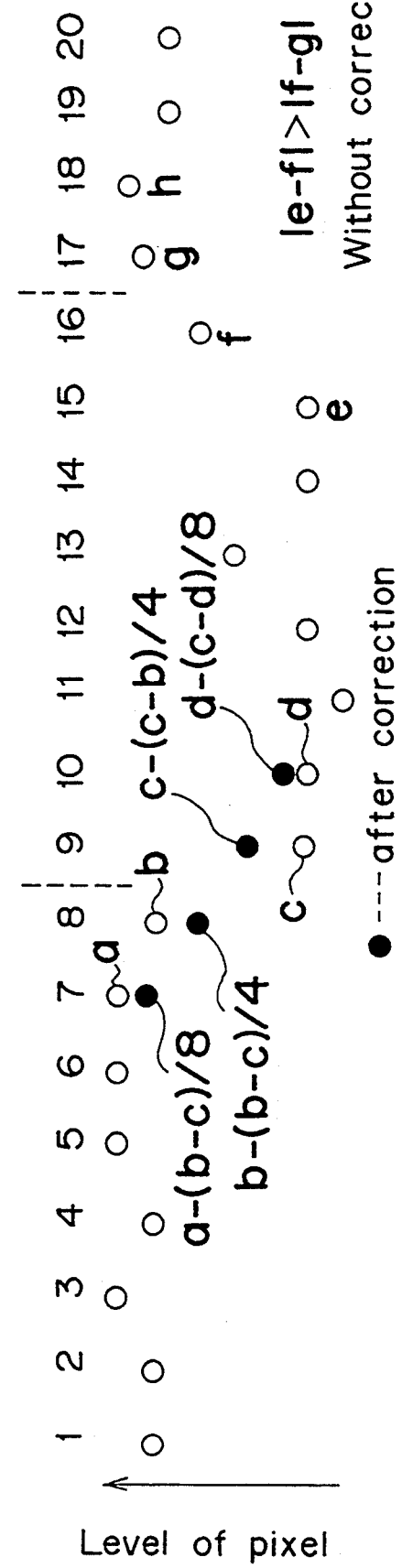

METHOD OF CORRECTING AN IMAGE SIGNAL DECODED IN BLOCK UNITS

This is a continuation-in-part of Ser. No. 07/870,633, filed on Apr. 20, 1992, now abandoned.

BACKGROUND OF THE INVENTION

1. Field of the invention

The present invention relates to a method and recording and reproducing device for correcting an image signal by bandwidth compression accompanying a DCT (Discrete Cosine Transform) or other block processing method.

2. Prior art

DCT and other conversion coding processes have become the standard in bandwidth compression due to their high efficiency, typically compressing the raw image data from 1/10th to 1/40th of their original size. An unfortunate side effect of a high compression ratio, however, is the appearance of so-called block distortion resulting from visually obvious level differences between blocks. For example, when the signal is compressed with DCT blocks comprising eight pixels horizontally and vertically, there will be lines in the decoded signal every eight pixels horizontally and vertically, resulting in a picture that is visually disturbing to view.

SUMMARY OF THE INVENTION

Therefore, the present invention is a signal correcting method for a signal processing method which applies bandwidth compression coding by blocks of plural proximal pixels in the image signal and the decoded signal is output after decoding with the same block units. When a level difference occurs at the border between adjacent blocks during decoding, the pixel level near the block border is corrected so that this level difference is reduced before outputting the decoded signal.

Furthermore, if the difference in the level of two pixels at the border of one block is less than a predetermined level during decoding, and the level difference between these pixels and two pixels in the adjacent block is greater than the level difference between the pixels in the same block, the level of the pixels proximal to the block border is corrected to reduce the difference between the border pixels of the two blocks before outputting the decoded signal.

It is therefore possible to smooth the level difference between blocks and thus greatly reduce visible block distortion without degrading the resolution of the image when there are level differences between the blocks of the compressed signal.

BRIEF DESCRIPTION OF THE DRAWINGS

The present invention will become more fully understood from the detailed description given below and the accompanying diagrams wherein:

FIG. 2 is a pixel level simulation used to describe the first embodiment of the invention; and FIG. 3 is a pixel level simulation used to describe the second embodiment of the invention.

DESCRIPTION OF PREFERRED EMBODIMENTS

Figure 1:
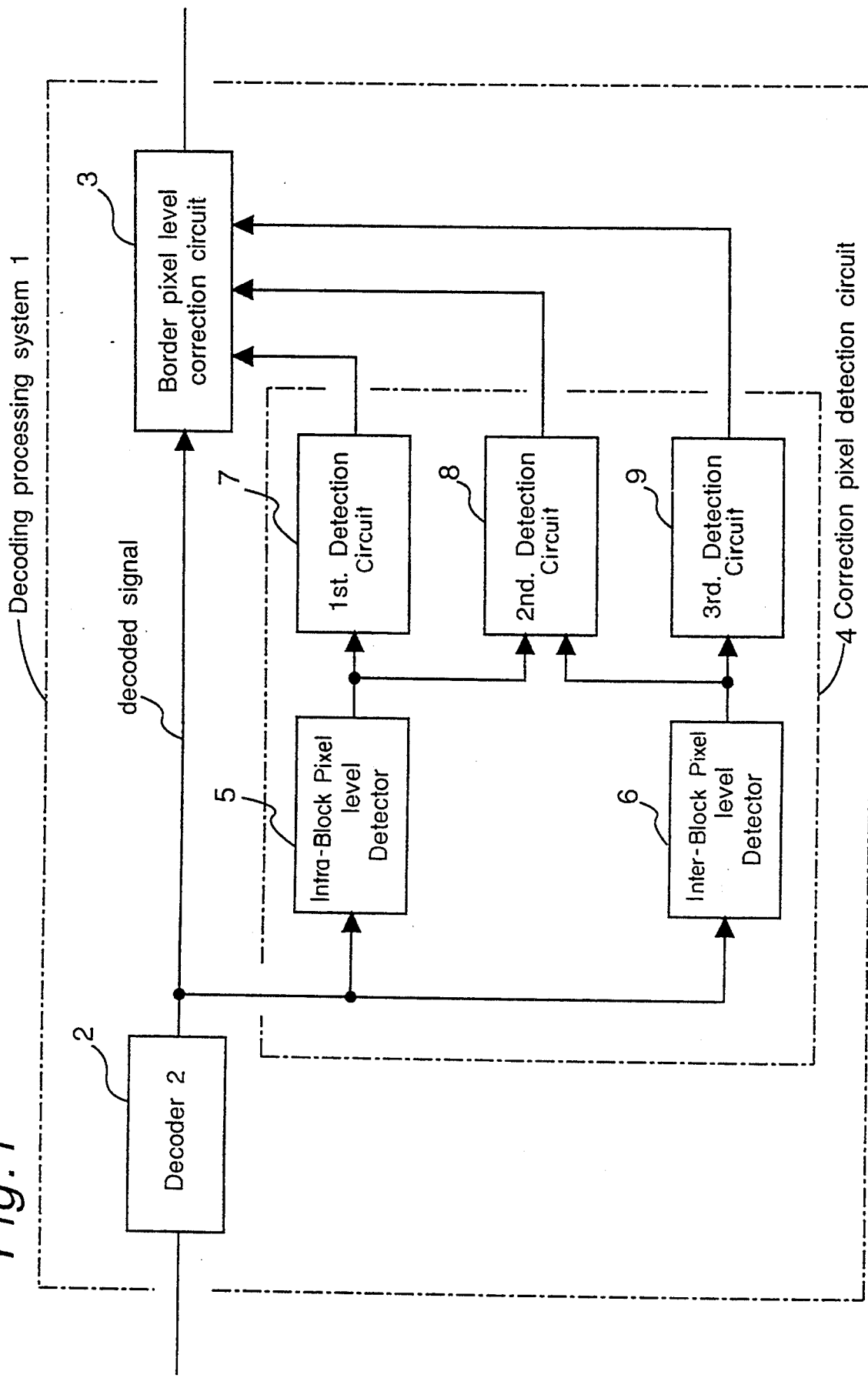
FIG. 1 is a block diagram of the preferred embodiment of the invention.

FIG. 1 is a block diagram of the decoding processing block used to achieve the invention. The compressed digital image data is input to the decoding circuit 2 for decoding. It is assumed for the purposes of the following description that block distortion occurs in the decoded signal.

The pixels requiring correction are detected by the correction pixel detection circuit 4, and the level is then corrected by the block border pixel level correction circuit 3 to reduce the level difference between the blocks.

The correction pixel detection circuit 4 further comprises an intra-block pixel level detection circuit 5 for detecting the level difference between two pixels within the same block and at the border thereof, a first detection circuit 7 for detecting whether the intra-block pixel level is less than a predetermined level, an inter-block pixel level detection circuit 6 for detecting the level difference between the border pixel in a first block and the border pixel in a second and adjacent block, a second detection circuit 8 for detecting whether the inter-block pixel level difference is greater than the level difference of two pixels within the adjacent block, and a third detection circuit 9 for detecting whether the level difference of the border pixels in two adjacent blocks is greater than a predetermined level, and determines that the pixels detected by all or at least one of the first, second, or third detection circuits requires correction.

The decoder 2 decodes a compressed digital image signal input thereto into block units consisting of a predetermined number of pixels. The decoding method for compressed digital image signals is well known to those skilled in the art and, accordingly, no further explanation is included. However, the decoder itself is on the market, for instance, as an MPEG decode chip or the like.

Each pixel signal decoded by the decoder 2 is a digital signal indicating a pixel level represented by, for instance, eight bits.

In this preferred embodiment, eight pixel signals are decoded into block units.

The pixel signals in block units are input to both the border pixel level correction circuit 3 and the correction pixel detection circuit 4.

The border pixel level correction circuit 3 corrects pixel signals detected to be corrected by the correction pixel detection circuit 4.

The correction pixel detection circuit 4 is comprised of intra-block pixel level detector 5, inter-block pixel level detector 6, and fist to third detection circuits 7 to 9.

The intra-block pixel level detector 5 compares levels of two adjacent pixels in the same block to detect a level difference therebetween.

The inter-block pixel level detector 6 compares levels of border pixels in two adjacent blocks, namely, pixels located on both sides of a border of two adjacent blocks, to obtain a level difference therebetween.

Thus, these detectors 5 and 6 have an essentially same function.

The first detection circuit 7 compares the intra-block level difference between the first two pixels and the intra-block level difference between the last two pixels detected by the intra-block pixel level detector 5 with a predetermined first threshold value.

The second detection circuit 8 compares the intra-block level difference of the last two pixels of the foregoing block with the inter-block level difference between the foregoing block and the present block adjacent thereto.

The third detection circuit 9 compares the inter-block level difference detected by the inter-block pixel level detector 6 with a predetermined second threshold value.

The results obtained by the first to third detection circuits 7 to 9 are input to the border pixel level correction circuit 3.

The border pixel level correction circuit 3 determines the pixel signals to be corrected and amounts of correction according to the results input thereto.

The way the pixel levels are corrected is indicated illustratively in FIG. 2 or 3 and is explained below.

The horizontal data of a simulated image signal is own in FIG. 2. Each block in this simulated signal is an $8 \times 8$ pixel block, with pixels 1-8, 9-16, and 17-24 in FIG. 2 each forming a separate block. Furthermore, the simulation shows a level difference between pixels 8 and 9, and 16 and 17. It is to be noted that the decoded signal is output after correcting the pixels indicated with a black dot.

The method of obtaining the amount of correction to be applied is described next.

If the level of pixel 8 is a and that of pixel 9 is b, then the pixel 8 level = a − (a − b)/K and the pixel 9 level = b − (b − a)/K where K is a value between 3 and 5.

It is thus possible to reduce the inter-block level difference while greatly improving the visible image quality.

It should be noted that when pixels with a significant real level difference between blocks are coded and decoded, level correction will effectively blur the contour lines and is therefore undesirable.

Thus, if the absolute value $|a-b|$ of the pixel level difference between the blocks is greater than a predetermined level, it is assumed that this accurately reflects the difference between the original pixels in the raw image signal, and correction is preferably not performed.

In other words, the above level correction is applied only when the absolute pixel difference $|a-b|$ is less than the predetermined level. This predetermined level is defined as approximately 10 when 8-bit quantization is used.

The pixels to be corrected are detected by the first inter-block pixel level detection circuit 6 and the third detection circuit 9.

A second embodiment of the present invention is described below with reference to FIG. 3.

This embodiment considers the level between two pixels within the same block and at the block border, and the level of pixels between two blocks.

If the levels of pixels 7, 8, 9, and 10 are a, b, c, and d, respectively, and the block distortion is conspicuous, then the absolute values $|a-b|$ and $|c-d|$ are small and the absolute value $|b-c|$ is large. It is therefore possible to smooth the level difference between the blocks by applying correction such that

| |
|---|
| pixel 7 = a − (b − c)/m |
| pixel 8 = b − (b − c)/n |
| pixel 9 = c − (c − b)/n |
| pixel 10 = d − (c − b)/m | where n is approximately equal to 4 and m is approximately equal to 8.

It is to be noted that the correction described with reference to the first embodiment above may also be applied to pixels 8 and 9. Furthermore, correction is not required because the block level difference is in any case inconspicuous when the intra-block pixel level differences $|1-b|$ and $|c-d|$ are greater than a predetermined level (e.g., approximately 8 with 8-bit quantization).

Furthremore, correction is not applied when the pixel level difference between blocks is greater than the predetermined level (e.g., approximately 10 with 8-bit quantization) because the level difference is determined to exist in the original image. This is the same principle applied in the first embodiment described above.

The processing of pixels 15, 16, 17, and 18 is described next. The levels of these pixels are identified as e, f, g, and h, respectively.

If the absolute value of the difference between two pixels $|e-f|$ or $|g-h|$ in one of two adjacent blocks is greater than the absolute value of the difference of the two pixels at the block border $|f-g|$, it can be assumed that the inter-block level difference is a true representation of the original signal, and correction is not required. Level difference correction is therefore not required when the relationship expressed by the equation $|e-f| > |f-g| > |g-h|$ is true.

Level correction is therefore applied in the second embodiment when all or any one of three conditions is satisfied. These conditions are, specifically:

1. when the intra-block pixel difference ($|a-b|$, $|c-d|$) at the block border is less than a predetermined level (approximately 8 with 8-bit quantization).

2. when the inter-block pixel level difference is greater than the intra-block pixel difference in either of the adjacent blocks ($[|b-c| > |a-b|]$ and $[|b-c| > |c-d|]$); and 3. when the inter-block pixel difference is less than a predetermined level (approximately 10 with 8-bit quantization).

These conditions are evaluated by the blocks shown in FIG. 1. Specifically, the first condition is evaluated by the intra-block pixel level detection circuit 5, which detects the level difference between two pixels within the same block and at the border thereof, and the first detection circuit 7, which detects whether the intra-block pixel level difference is less than a predetermined level.

The second condition is evaluated by the intra-block pixel level detection circuit 5, the inter-block pixel level detection circuit 6, which detects the level difference between the border pixels of two adjacent blocks, and a second detection circuit 8, which detects whether the inter-block pixel level difference is greater than the level difference of two pixels within the adjacent block.

The third condition is evaluated by the inter-block pixel level detection circuit 6 and the third detection circuit 9, which detects whether the level difference of the border pixels in two adjacent blocks is greater than a predetermined level.

It is to be noted that this correction is applied to one or all of the horizontal, vertical, and time axes of the image.

Furthermore, the values for the predetermined levels shall not be limited to the values stated hereinabove.

In addition, the predetermined levels can be varied adaptively according to the image, specifically according to the noise level, recording or reproducing mode, or other characteristics of the image.

In addition, the preferred embodiments were described hereinabove with correction applied to 2-4 pixels at the block border, but the number of corrected pixels shall not be thus limited.

The block size was also described as being 8 by 8 pixels, but a 4×4 pixel or other block size can also be used.

Furthermore, the correction applied by the invention can also be turned on/off and controlled according to the compression ratio, operating detection, or other information.

Finally, it is to be noted that the description of the invention is identical whether it is applied on the recording or reproducing side of an image recording and reproducing device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of correcting an image signal decoded in block units consisting of a predetermined number of pixels comprising the steps of:
   detecting an inter-block pixel level difference between border pixels in two adjacent blocks;
   comparing said inter-block pixel level difference with a predetermined threshold value; and
   correcting the levels of said border pixels such that the difference between said levels of said border pixels falls within said predetermined threshold value if said inter-block pixel level difference is greater than said predetermined threshold value.

2. The method of correcting an image signal as claimed in claim 1, wherein, in the step of correcting the levels of said border pixels, said levels of said border pixels are respectively corrected by amounts which are proportional to said inter-block pixel level difference.

3. A method of correcting an image signal decoded in block units consisting of a predetermined number of pixels comprising the steps of:
   detecting an intra-block pixel level difference between two adjacent pixels including a border pixel in the same block;
   detecting an inter-block pixel level difference between border pixels in two adjacent blocks;
   comparing said intra-block pixel level difference with a predetermined first threshold value;
   comparing said inter-block pixel level difference with a predetermined second threshold value which is larger than said predetermined first threshold value; and
   correcting the levels of said border pixels such that the difference between said levels of said border pixels falls within said predetermined second threshold value only if said intra-block pixel level difference of each of said two adjacent blocks is smaller than said predetermined first threshold value and said inter-block pixel level difference is greater than said predetermined second threshold value.

* * * * *